Figure 4:
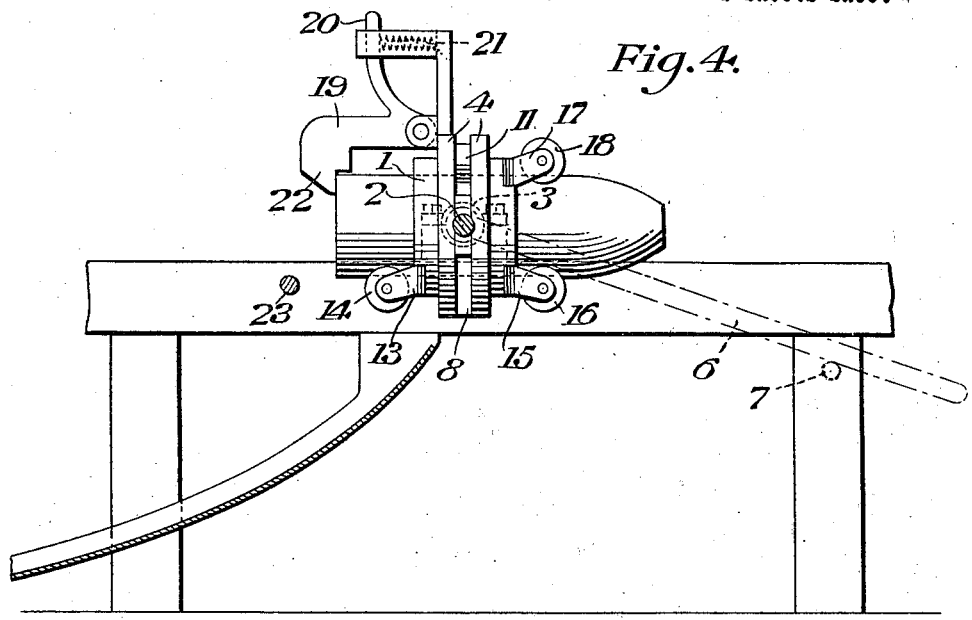

May 6, 1924.
G. ALLISON
CHUCK
Filed Oct. 5, 1923
1,492,950
2 Sheets-Sheet 1
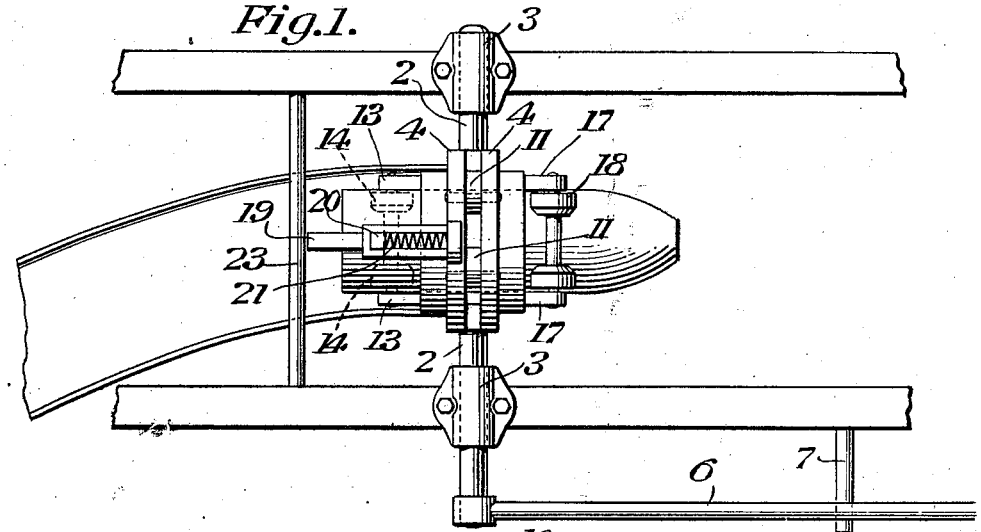
INVENTOR
Gustave Allison
BY
ATTORNEYS May 6, 1924.

G. ALLISON

CHUCK

Filed Oct. 5, 1923

1,492,950

2 Sheets-Sheet 2

INVENTOR
Gustave Allison
BY
ATTORNEYS

Patented May 6, 1924.

1,492,950

UNITED STATES PATENT OFFICE.

GUSTAVE ALLISON, OF PERTH AMBOY, NEW JERSEY, ASSIGNOR TO COLUMBIA SALVAGE CORPORATION, OF NEW YORK, N. Y., A CORPORATION OF NEW YORK.

CHUCK.

Application filed October 5, 1923. Serial No. 666,757.

*To all whom it may concern:*

Be it known that I, GUSTAVE ALLISON, a citizen of the United States, and resident of Perth Amboy, in the county of Middlesex and State of New Jersey, have invented certain new and useful Improvements in Chucks, of which the following is a specification.

The main object of this invention is to provide a chuck which will automatically receive, center and grip the piece to be worked upon and which may be tilted for the purpose of automatically discharging the piece from the chuck.

A chuck constructed in accordance with this invention is especially designed for holding heavy pieces of material, but of course, it may be adapted for many uses. As shown in my application filed April 25, 1923, Serial #634,526, it is used as a chuck for holding explosive artillery shells while removing the booster charger and this application is filed as a division of my said earlier application.

Figure 5:
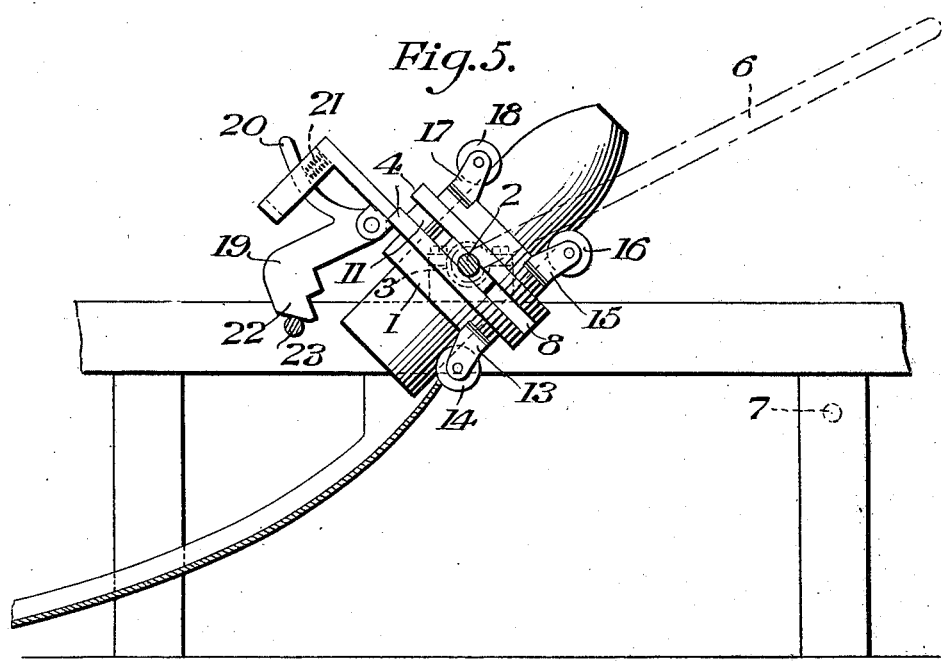

In the drawings:

Fig. 1 is a plan view of the chuck;

Fig. 2 a transverse sectional view thereof;

Fig. 3 a longitudinal sectional view thereof;

Fig. 4 a side elevation, partly in section showing the chuck in operative position with a piece of material held therein; and Fig. 5 a view similar to Fig. 4 showing the chuck tilted and in position to discharge the piece of material therefrom.

Referring to the various parts by numerals, 1 designates the chuck body which is tubular and is rigidly connected to transversely extending trunnions 2, said trunnions being mounted in bearings 3 suitably supported. The chuck body is formed about midway its ends with radially outwardly extending parallel flanges 4 spaced apart a suitable distance to form a narrow annular channel between them. The heads 5 of the trunnions 2 are rigidly connected to the chuck body between said flanges at diametrically opposite points and in the same horizontal plane. One of the trunnions is extended beyond its bearing and carries a handle 6 which normally rests against a rigid stop 7 and holds the body of the chuck in a horizontal position.

The lower part of the chuck body, between the flanges 4, is slotted to receive a rigid gripping plate 8. The upper edge of this plate is concentric with the interior of the chuck body and is provided with teeth 9, said teeth projecting slightly within the chuck, as shown clearly in Fig. 2. The upper portion of the chuck, between the flanges 4, is slotted as at 10; and pivotally mounted between the flanges 4 are two eccentric gripping dogs or cams 11. One of these cams is mounted on each side of the vertical center of the chuck; and they are eccentrically mounted so that they will swing down by gravity through the slot 10 and automatically engage the piece of material inserted in the chuck. The lower edge of these gripping cams are provided with sharp teeth 12 adapted to engage the piece of material inserted in the chuck.

The receiving and discharging end of the chuck is provided near its lower edge, that is to say below the horizontal axis of the body of the chuck, with longitudinally extending lugs 13 in which are journalled two rollers 14. The inner faces of these rollers are beveled to adapt them to engage the cylindrical surface of the piece to be received in the chuck. These rollers serve as guiding and centering means and receive the piece and direct it into the cylindrical chuck and also serve as a supporting means. The forward edge of the chuck is provided with two longitudinally extending lugs 15 which correspond precisely with the lugs 13; and these lugs 15 carry rollers 16 which correspond precisely with the rollers 14. The two pairs of rollers 14 and 16 serve as means for supporting the piece in the chuck and give to said piece a substantial bearing on opposite sides of the gripping plate 8. The forward end of the chuck, above its horizontal axis, is provided with two forwardly extending lugs 17, at opposite sides thereof, and these lugs carry upper rollers 18. These rollers are adapted to engage the upper surface of the piece to be operated upon, their inner faces being beveled precisely as the rollers 14 and 16. Pivoted to the upper part of the chuck at the receiving end thereof is an automatic latch 19. This latch is adapted to drop down and to engage the end of the piece in the chuck and to hold it against a return longitudinal movement. The latch is provided with an upwardly extending arm 20 which is pressed outwardly away from the chuck by a spring 21 so that said spring throws the latch 19 downwardly. The head of the latch is beveled downwardly to form a cam surface 22 which is adapted to be engaged by the piece as it enters the chuck so that said latch will be lifted and when the piece is properly positioned in the chuck the latch will snap down and engage the end thereof.

When the chuck is used for the purpose of holding artillery shells, as described in my aforementioned application for patent, the shells are preferably delivered down an inclined conveyor, pointed end foremost so that the tapered end of the shell will engage the inclined surface of the latch and lift it out of the way and pass into the chuck. The tapered end of the shell will engage and lift the automatic gripping cams 12. When the base of the shell has passed beyond the inner edge of cam 22 the latch 19 will snap down over the base of the shell. The shell is then securely held within the chuck against rotation, by the dogs 8 and 11 and the latch 19 holds it against any longitudinal thrust tending to force it out of the chuck. When it is desired to release the piece from the chuck the handle 6 is raised and the chuck body tilted on its trunnions. The beveled face 22 of the latch 19 will engage a stop 23 and will be swung on its pivot to release the piece and permit it to drop from the chuck. This operation is clearly illustrated in Fig. 5. While the chuck is more especially designed for receiving shells having a tapered end it will, of course, be understood that it is adapted for various uses.

As shown in Fig. 2 of the drawings, the dogs 11 are arranged to prevent a counter-clock-wise rotation of the piece held in the chuck, but, of course, they may be arranged to prevent a clock-wise rotation of the piece.

What I claim is:

1. A chuck comprising a pivotally mounted horizontal tubular chuck body, means for normally maintaining said body in a horizontal position, a pair of gravity clutch dogs carried by the chuck body and adapted to hold against rotation the piece of material received in the chuck, an automatically operating device for locking said piece in the chuck, means for tilting said chuck, and means to engage and release the said locking device.

2. A chuck comprising a horizontal tubular body part, horizontal oppositely extending trunnions rigidly connected to said body at diametrically opposite points, means connected to one of said trunnions for tilting the chuck body on said trunnions, a stop for normally maintaining the chuck body in a horizontal position, a pair of gravity dogs pivoted in the chuck body and adapted to drop down into the chuck body to engage a piece of material held therein, a latch adapted to engage one end of the piece within the chuck body to hold it therein against longitudinal movement in one direction, and means to engage said latch to release it when the chuck body is tilted.

3. A chuck comprising a pivotally mounted horizontal tubular chuck body, means for normally maintaining said body in a horizontal position, a pair of excentrically mounted gravity clutch dogs carried by the chuck body and adapted to drop down into the chuck body to engage the piece therein and to hold it against rotation, an automatically operating device for locking said piece in the chuck, means for tilting said chuck, and means to engage and release the said locking device.

4. A chuck comprisng a pivotally mounted horizontal tubular chuck body, means for normally maintaining said body in a horizontal position, means carried by the clutch body to engage the piece within the clutch body and to hold it against rotation, an automatically operating device for locking said piece in the chuck, means for tilting said chuck, and means to engage and release the said locking device.

5. A chuck comprising a pivotally mounted horizontal tubular chuck body, means for normally maintaining said body in a horizontal position, gravity operated means carried by the clutch body to engage the piece within the clutch body and to hold it against rotation, an automatically operating device for locking said piece in the chuck, means for tilting said chuck, and means to engage and release the said locking device.

6. A chuck comprising a horizontal tubular chuck body, means for supporting said body on transverse horizontal pivots, means for normally maintaining said body in a horizontal position, means carried by the clutch body to engage the piece within the clutch body and to hold it against rotation, and means for tilting said chuck body to discharge the piece therefrom.

7. A chuck comprising a horizontal tubular chuck body, means for supporting said body on transverse horizontal pivots, means for normally maintaining said body in a horizontal position, automatically operating means carried by the clutch body to engage the piece within the clutch body and to hold it against rotation, and means for tilting said chuck body to discharge the piece therefrom.

In testimony whereof I hereunto affix my signature.

GUSTAVE ALLISON.